June 20, 1961  SAMPEI GOTO ET AL  2,988,955
BINOCULAR PROVIDED WITH AN IMPROVED INTERLOCKING
DEVICE BETWEEN A PAIR OF OCULAR SYSTEMS
Filed Dec. 15, 1958  2 Sheets-Sheet 1

United States Patent Office 2,988,955
Patented June 20, 1961

2,988,955
BINOCULAR PROVIDED WITH AN IMPROVED INTERLOCKING DEVICE BETWEEN A PAIR OF OCULAR SYSTEMS
Sampei Goto, 181–1 Uetake-machi; Syusaku Hosaka, 365–1 Uetake-machi; Yoshikazu Doi, 131–1 Uetake-machi; and Hajime Osumi, 795–1 Kushihiki-machi, all of Omiya-shi, Saitama, Japan
Filed Dec. 15, 1958, Ser. No. 780,585
2 Claims. (Cl. 88—34)

This invention relates to a binocular, more particularly to improvement of a binocular having a pair of ocular systems of changeable magnification and a device for adjusting the distance between a pair of ocular systems not causing change of magnification of the ocular systems.

The object of this invention is to provide a compact binocular which has a wide angle of incidence and effectively correct aberration of light flux.

Another object of this invention is to provide a binocular which has such a small size as capable of being conveniently carried with but can change its magnification to desired successive values without changing the focal length of its lens system, and gives an apparent wide field of view of erect image.

Another object of this invention is to provide a binocular in which a pair of oculars can change their magnification simultaneously at the same rate in the adjustment of magnification through an interlocking device and the distance between the two oculars can be adjusted according to the distance between the eyes of a user without changing the magnification of the two oculars.

It has been proposed to change the magnification of an optical system by constructing an optical system consisting of a plurality of lens units (lens unit may be composed of a single lens or several lens sections and these units are arranged shiftably along an optical axis) and by shifting some of lens units along the optical axial direction in order to change the magnification of the optical system. However, the optical system of this type is suitable only for an optical system which has a small angle of view as in the case of a cinema camera of a small size and has a part of changeable lens which may be called an attachment but has a very great size in comparison with the small size of the part which may be called its main lens.

The main object of the construction of this optical system is not to correct positively the aberration of the system, but is to attain the decrease of the shift of the focus by avoiding the aberration to some extent in the larger shiftable part.

On the contrary, the oculars in a binocular are generally used for a wide apparent angle of view (usually about 50°), and hence it is important firstly to obtain sufficiently good correction of aberration in respect of light flux of such a wide angle. However, at the same time, it is important not to make it too big, taking into account the use of a prism and others in a binocular.

It has also been publicly known to obtain successively changeable magnification by shifting an erect lens system along the optical axis in a terrestrial telescope having an erect lens system. Further it has also been publicly known to combine a prism having no action of reversing an image in a binocular by applying the principle of the terrestrial telescope as described above and to obtain a binocular capable of changing the magnification successively.

However, the telescope and the binocular according to such a system will be necessarily long and not convenient to carry with in view of the principle of its construction and the requirements of its technical design. Further these telescopes and binoculars have much difficulty in obtaining a sufficiently wide apparent angle of view and are utterly unusable as a portable instrument. Moreover, in a binocular where a prism as described above is used, the action of said system is simply to change the direction of the light flux and therefore it is not suitable for the practical purpose in comparison with a conventional binocular provided with a Porro prism which is an erect prism and attains the change of direction of light flux and also reversing of the image to give an erect image in natural condition.

In a prism type binocular, it is general and reasonable practice to construct the part of the optical system in the rear of a prism, that is, a part which may be called the ocular part, with only lens groups having positive power. (The lens group used herein means a single lens or a composite lens formed by adhering two or more component lens sections which are arranged in a group.)

The present invention is utterly different from any of the conventional systems as described above, and has no necessity of making its body holding lenses large, but still can change its magnification successively in a wide range and is comparable in the good correction of aberration with a conventional binocular of very good quality which has a definite magnification and is capable of correcting aberration effectively. The apparent angle of view over 44° may be easily obtained, even if the position of the exit pupil is maintained substantially constant.

Accompanying drawings illustrate some embodiments of the present invention for the purpose of detailed explanation of the present invention.

Now explanations will be made with reference to the drawings.

Figure 1A:
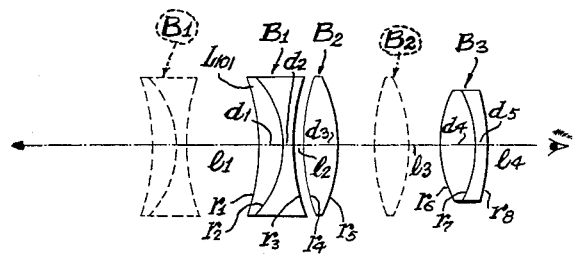
FIGS. 1a, 1b and 1c are side views illustrating the constructions of oculars having changeable magnification according to the present invention.
Figure 1B:
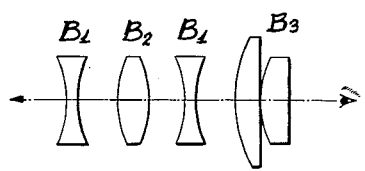
Figure 1C:
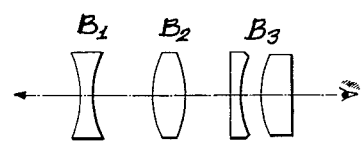

In FIGS. 1a, 1b and 1c, the ocular has three lens groups, group $B_1$ on the side of the objective lens, group $B_3$ on the side of the eye of a user and group $B_2$ in the intermediate. Groups $B_2$ and $B_3$ are positive and group $B_1$ is negative.

It is to be understood the word "group" herein used does not necessarily mean a group of a number of lenses but simply means a lens which may be a simple lens as $B_2$ of FIG. 1a or a compound lens as $B_3$ of FIG. 1a which has two or more element lenses combined together. It is further to be understood the words "positive lens" mean a lens having positive focal length and the words "negative lens" mean a lens which has a negative focal length.

The lens group $B_3$ is fixed in the assembly of the ocular while the lens groups $B_1$ and $B_2$ are shiftable in the direction of the optical axis thereby to change the magnification of the ocular. In the construction of the ocular, it is necessary to have at least one negative lens $B_1$ and it is preferable to place the negative lens on the object side. This arrangement will give a relatively wide range of variation of magnification by the shift of the negative lens in the optical axial direction and an advantage in respect of exit pupil because of the position of the negative lens on the object side.

Now assume that the focal lengths of lens groups $B_1$, $B_2$ and $B_3$ of the ocular as described above are $f_{100}$, $f_{200}$ and $f_{300}$ respectively and make their relative values to satisfy the following relations:

$$-1.6 < \frac{f'_{100}}{f'_{300}} < -0.8$$

$$0.4 < \frac{f'_{200}}{f'_{300}} < 1.2$$

Then relatively good results may be obtained in respect of single color ray even if the apparent visual angle is as wide as 45° with simple construction of lens groups $B_1$, $B_2$ and $B_3$ as described hereafter. However, the chromatic aberration is aggravated in a great size image and therefore at least one positive lens of small Abbe number is inserted in the lens group $B_1$ in order to improve the aberration.

In general, when a combined lens composed of a positive lens and a negative lens having different Abbe numbers is used in order to correct the chromatic aberration of a lens system, it is unavoidable to increase the thickness of the lens in the optical axial direction at the place of combination. This is a matter of concern in a binocular which has small and narrow body but requires to have a wide visual angle and sufficient light flux with correction of aberration while maintaining the eye points (base length) in proper positions in respect of the whole range of magnification.

It is also a difficult problem to correct sufficiently axial color aberration and chromatic aberration of magnification over all range of magnification.

This invention solves these problems by inserting a positive lens of small Abbe number in the lens group $B_1$ of the ocular having the construction as described above. According to this invention, a binocular which can attain successively changeable magnification with a relatively simple construction can be obtained with no necessity of increasing the size much in comparison with a conventional binocular.

In the ocular of the present invention, a lens system which may be deemed a part of an objective lens may be fixed in front of the lens group $B_1$ in a relatively short distance (opposite to the eye side) and said ocular provided with such an additional lens system may be used similarly.

An example of the embodiments of the present invention where the focal length of the ocular $f$ is 100 is set forth hereunder as an illustration.

| Radius of curvature | Thickness of lens and air space | Index of refraction (of $d$ ray) $n_d$ | Abbe number $\gamma$ |
|---|---|---|---|
| | $l_1 = 19.0$ | | |
| $r_1 = -114.84$ | | | |
| | $d_1 = 125$ | 1.7847 | 25.7 |
| $r_2 = -71.428$ | | | |
| | $d_2 = 5.0$ | 1.5891 | 61.2 |
| $r_3 = 350.14$ | | | |
| | $l_2 = 5.0$ | | |
| $r_4 = 228.94$ | | | |
| | $d_3 = 25.0$ | 1.5891 | 61.2 |
| $r_5 = -95.492$ | | | |
| | $l_3 = 67.5 \ (28.0)$ | | |
| $r_6 = 87.75$ | | | |
| | $d_4 = 25.0$ | 1.5891 | 61.2 |
| $r_7 = -74.87$ | | | |
| | $d_5 = 5.0$ | 1.7847 | 25.7 |
| $r_8 = 266.53$ | | | |
| | $l_4 = 68.3$ | | |

In the above the value of bracket represents the case where $f = 50$.

The focal lengths of lens groups $B_1$, $B_2$ and $B_3$ are $f'_{100} = -174.4$; $f'_{200} = 117$ and $f'_{300} = 143.8$ and hence $$\frac{f'_{100}}{f'_{300}} = -1.21 \text{ and } \frac{f'_{200}}{f'_{300}} = 0.82$$

The Abbe number of the lens group $B_1$ is 25.7 and less than 40.

Now the device for shifting one or more lens groups of the ocular in the optical axial direction will be explained.

Figure 2:
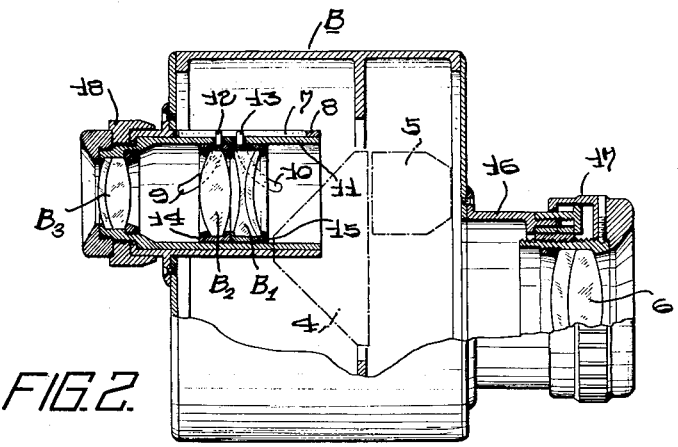
FIG. 2 is a side view partly in section and partly broken away of a portable telescope provided with a Porro prism having changeable magnification.

In FIG. 2, a fixed outer tube 8 has a slit 7 in the optical axial direction. An inner tube 11 provided with two guides grooves 9, 10 inclined in opposite directions is rotatably inserted in the outer tube 8. In the inner tube 11 are mounted innermost tubes 14 and 15 in which lens groups $B_2$ and $B_1$ are fixed. The innermost tubes have projected pins 12, 13 respectively. These pins are in engagement with the groove 9 or 10 of the inner tube 11 and the slit 7 of the outer tube 8. It is therefore apparent that when the inner tube 11 is rotated, the innermost tubes 14, 15 are moved in opposite directions to change the distance between the two lens groups $B_2$ and $B_1$. Image reversing prisms 4 and 5 are fixed in the binocular casing B and an objective lens system 6 is slidably attached in the tube 16 integral with the casing B. Thus the focal length of the objective lens system 6 may be adjusted. Since the focal length of the objective lens system 6 is adjustable, the construction of the ocular system may be simplified. The reversed image coming from the objective lens system is made an erect image by reversing prisms 5 and 4 and enters the ocular system by changing its optical axis. A user of the binocular can see the image through the fixed lens group $B_3$ of the ocular system while adjusting the focal length by means of an adjustment ring 17. When it is desired to adjust the magnification, an adjustment ring 18 is rotated to rotate the inner ring 11 thereby to change the positions of the innermost tubes or rings 14, 15 and consequently the positions of the lens groups $B_2$ and $B_3$. Thus the magnification may be changed successively to a desired value.

In a binocular, it is necessary to change the distance between a pair of oculars to accord with the distance between the two eyes of a user and also to adjust the magnification at the same degree in the two oculars. Now a device for attaining these purposes will be explained.

Figure 3:
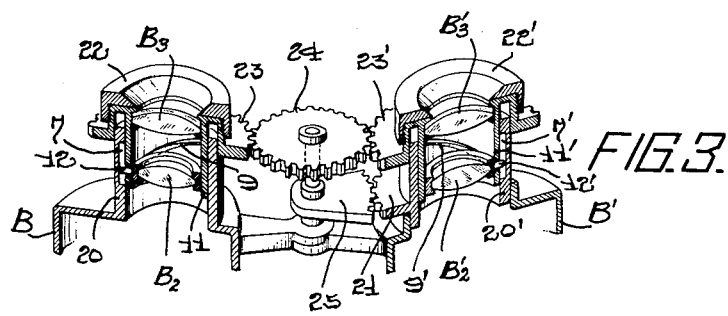
FIG. 3 is a perspective view illustrating a part of a binocular having an interlocking device for changing the magnification of the optical systems on opposite sides by same degree.

FIG. 3 illustrates an embodiment where one of the lens groups of the ocular is shifted, but it will be the same with an embodiment where two lens groups are shifted in opposite directions as explained above. In FIG. 3, the left side outer tube 20 of the left side ocular is integral with the left part B of a binocular body and has a longitudinal slit 7 on its inside wall. The right side outer tube 20' is rotatably mounted in the right side part B' of the binocular body and is provided with a fixed gear 21 and a longitudinal slit 7' formed on the inside wall. On these outer tubes 20, 20' are rotatably mounted ocular tubes 22 and 22' having inner tubes 11, 11' projecting into the outer tubes 20 and 20' respectively. These ocular tubes have fixed lenses $B_3$, $B'_3$ and shiftable lenses $B_2$, $B'_2$ respectively. The shiftable lenses $B_2$, $B'_2$ have pins 12, 12' on their rings respectively and these pins are in engagement with the spiral grooves 9, 9' formed in the walls of the inner tubes 11, 11' and the longitudinal slits formed on the inside walls of the outer tubes 20, 20'. It is therefore apparent that the shiftable lenses $B_2$, $B''_2$ are moved longitudinally when the inner tubes 11, 11' are rotated in relation to the outer tubes 20, 20'. The inner tubes 11, 11' forming parts of the ocular tubes 22, 22' have gears 23, 23' which are interlocked by means of an intermediate gear 24. The left side part B and the right side part B' of the binocular is pivotally connected by a shaft so that the distance between the ocular systems may be adjusted according to the distance between the two eyes of a user. The left side part B of the binocular body has a fixed gear 25 which is in engagement with the gear 21 of the outer tube 20' of the right side.

When the ocular tube 22 or 22' (consequently the inner tubes 11 or 11') is rotated in order to change the magnification of the ocular system, the gear 23 or 23' integral with the inner tubes 11 or 11' is rotated and this rotation is transmitted to the gear on opposite side through the intermediate gear 24 and thus the shiftable lenses $B_2$ and $B_2'$ may be shifted in the same direction and by the same amount in relation to the fixed lenses $B_3$, $B_3'$ because of the engagement of the pins 12, 12' with the grooves 9, 9' of the inner tubes 11, 11' and the longitudinal slits 7, 7' of the outer tubes 20, 20'. Thus the magnification may be changed by the same amount in both the left side and the right side ocular systems. In this operation, the rotatable outer tube 20' is not rotated since it is in engagement through gears 21 with a gear 25 which is fixed on the binocular part B.

When it is desired to change the distance between the two ocular systems in order to make it accord with the distance between the two eyes of a user, the left side part B and the right side part of the binocular are turned around a pivot shaft to change the angle between the two parts. For the sake of simplifying the explanation, explanation will be made on the assumption that only the left side part B is rotated.

When the body part B is rotated, the gear 25 fixed thereon acts to rotate the gear 21 fixed on the right side outer tube 20'. Thus the outer tube 20' is rotated. When the outer tube 20' is rotated the shiftable lens $B_2'$ which has the pin 12' in engagement with the groove 9' of the inner tube 11' and the slit 7' of the outer tube 20' tends to rotate the gear 23' integral with the inner tube 11'.

On the other hand, the gear 23 integral with the inner tube 11 on the left side has a rotation, when the left hand side body part B is rotated, through the pin 12 of the lens $B_2$ which is in engagement with the groove 9 of the inner tube 11 and the slit 7 of the outer tube 20 which is integral with the body part B.

The rotary forces of the gears 23 and 23' are opposite directions and are compensated through the intermediate gear 24. In other words the intermediate gear is rotated in the direction to the reversed direction against the direction which will cause the displacement of the positions of the lenses $B_2$ and $B_2'$ in relation to the fixed lenses $B_3$ and $B_3'$ and thus the change of magnification may be prevented.

Figure 4A:
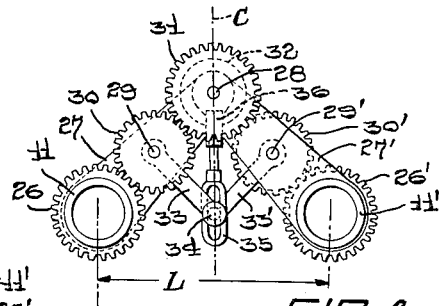
FIGS. 4a and 4b are a plan view and a front view of a binocular similar to that of FIG. 3, illustrating its essential parts.
Figure 4B:
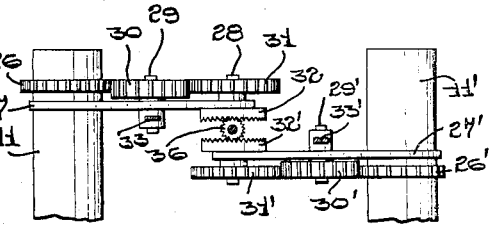

In FIGS. 4a and 4b, the inner tubes 11 and 11' on the right and left sides (they have similar grooves as the inner tubes of FIGS. 2 and 3) have fixed gears 26 and 26' respectively. These two tubes are supported by supporting members 27, 27' which are pivoted by a shaft 28. The gears 26 and 26' are in engagement with intermediate gears 30, 30' which are rotatably mounted on the support members 27, 27' by pivots 29, 29'. The support members 27, 27' have gears 31, 31' rotatably mounted on the shaft 28 and fixed crown gears 32 and 32' respectively. The gears 31 and 31' are in meshing relation with the intermediate gears 30 and 30' described above. The support members 27, 27' are provided with connecting links 33, 33' of the same length and pivoted at a same distance from the common pivot shaft 28. (In the drawing at the pivots 29 and 29' which serve as the pivotal shafts for the intermediate gears 29, 29'.) The other ends of the connecting links 33, 33' are connected by a pivot 34 which is slidable in the slot of a guide member 35 in alignment with the center line passing the center of the shaft 28. The guide member 35 has a pinion 36 which is arranged between the two crown gears 32, 32' and in engagement with them.

When the distance L between the two inner tubes 11, 11' is to be increased to adjust the length to correspond to the distance between the eyes of a user, one of the two tubes, for instance the inner tube 11, may be pulled upward. By this operation, the two inner tubes 11, 11' will be operated in symmetrical way on opposite sides through the links 33, 33'. The crown gears 32, 32' are turned in opposite directions but these rotations are absorbed by the pinion 36. In other words, the pinion is rotated but the gear systems of 26, 30, 31 and 26', 30', 31' do not change their positions in relation to their respective support members 27, 27' and the inner tubes 11, 11' are maintained stationary thereby to maintain the same magnification during and after the adjustment of the distance between the two ocular systems. Even if, by some frictional resistance, the pinion 36 is not sufficiently rotated, the magnification of oculars on opposite sides will be made by same degree and no unequal change of magnification will ever be caused.

Figure 5:
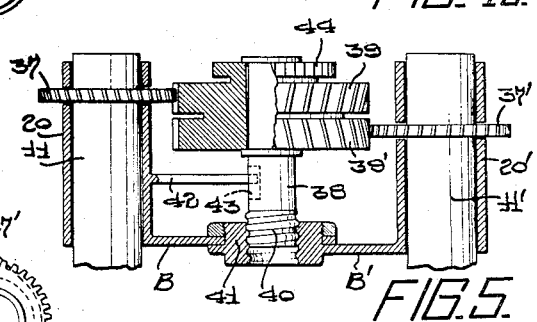
FIG. 5 is a front view of a binocular similar to the binocular of FIG. 3 but of a different construction.

In FIG. 5, the inner tubes 11, 11' are provided with helical gears 37, 37' and these gears are engaged with gears 39, 39' which are integral with each other and rotatably mounted on a shaft 38 and having teeth inclined in opposite directions. A screw 40 is formed on a part of the shaft 38 and the shaft 38 is screwed in a threaded tube member 41. This tube member 41 is fixed on the outer tube 20' on the right hand side but is rotatable in relation to the outer tube 20 on the other side. The outer tube 20 has a fixed pin 42 in engagement with the longitudinal groove 43 formed on the shaft 41. Accordingly the rotation between the outer tube 20 and the shaft 38 is not allowed although the longitudinal relative motion is allowed.

Now assume that the outer tube 20 is rotated around the threaded tube 41. This rotation will cause the rotation of the shaft 38 in relation to the threaded tube member 41 and the shaft 38 will be moved up or down. As the result the helical gears on the shaft 38 are also moved up or down. The meshing positions between the gears 37, 39 and between the gears 37', 39' may be changed by the rotation of the shaft 38 in the threaded tube 41 when the distances in vertical direction between the threaded tube 41 and the helical gears 37 and 37' are maintained constant respectively.

The helical gears 39 and 39' have teeth inclined in opposite directions and therefore the rotation of the inner tubes 11, 11' which may cause unequal magnifications in the operation of the adjustment of the distance between the two inner tubes may be effectively prevented by selecting properly the lead between the screw 40 and the threaded tube 41. In other words, the rotary positions of the helical gears 37, 37' in relation to the body parts B and B' will not be changed. In short, in this embodiment the rotary motions of the helical gears 37, 37' are absorbed by the up and down motion of the shaft 38 to prevent the rotation not desirable.

The change of the magnification is attained by turning an adjustment knob 44 integral with the gears 39, 39' around the shaft 38 or by turning one of the helical gears 37, 37'.

Figure 6:
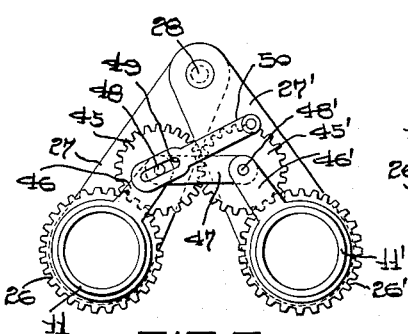
FIG. 6 is a plan view of a binocular of still another construction.

FIG. 6 illustrates another embodiment of the present invention. Inner tubes 11, 11' have fixed gears 26, 26' which are in engagement with intermediate gears which are connected by a connecting link 47 and are engaged with each other. 46, 46' are levers which have rings rotatably mounted on the inner tubes 11, 11'. The lever 46, the gear 45 and one end of the link 47 are pivoted together by a pin 48 and the lever 46', the gear 45' and the other end of the link 47 are pivoted together by a pin 48'. The inner tubes 11, 11' are supported by supporting members 27, 27' which are pivoted at 28 so that the distance between the inner tubes may be adjusted to accord with the distance of the eyes of a user of this binocular. Further, a guide link 50 is pivoted on the support 27' and a guiding slot 48 is formed in said link 50 in order to guide the pivot pin 48 when the angle between the two supports 27, 27' is adjusted so that the distance between a pair of oculars of the binocular may accord with the distance between the eyes of a user of the binocular.

When one of the inner tubes 11 is turned in order to change its magnification, the rotation is transmitted to the other inner tube through gears 26, 45, 45', 26' by the same amount so that the same magnification will be effected on both sides.

On the other hand, when one of the supports or both supports 27, 27' are operated to change the angle between the supports in order to adjust the distance between the two inner tubes, the intermediate gears 45, 45' only roll on the gears 26, 26' without causing the rotation of the latter gears and hence the magnification of the ocular may be maintained with no change.

Figure 7A:
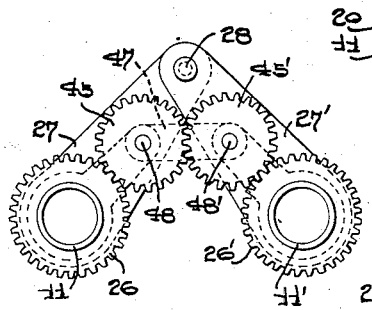
FIGS. 7a and 7b are a plan view and a front view of a binocular similar to a binocular of FIG. 3 of still another construction.
Figure 7B:
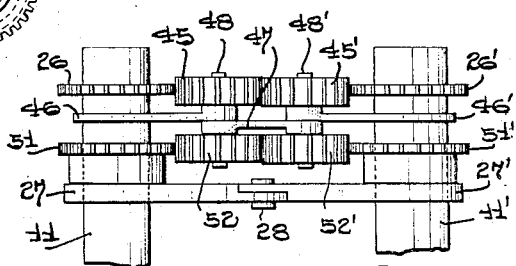

The embodiment of FIGS. 7a and 7b is similar to the embodiment of FIG. 6 excepting the omission of the guide link 50 and the addition of a gear system consisting of gears 51, 52, 52' and 51'. The gears 51 and 51' are fixed on the supports 27 and 27' respectively, and the inner tubes 11 and 11' can rotate in the gears 51 and 51'. The gear 51 is meshed with the gear 52 and the gear 51' with the gear 52'. These two gears 52, 52' are pivoted on the pivot pins 48 and 48' respectively similar to those of FIG. 6, that is a pin on which a lever 46 rotatably mounted on an inner tube 11, an intermediate gear 45 and a connecting link 47 are pivoted.

When the distance between a pair of the oculars of the binocular is adjusted, the supports 27 or 27' or both may be moved and the gears 52, 52' and gears 48, 48' may be rotated. But the gears 48, 48' simply roll on the gears 26 and 26' and do not cause the rotation of the gears 26, 26' and therefore the magnification may be maintained with no change.

On the other hand, when the distance between the inner tubes is maintained constant, and one of the inner tubes is rotated, this rotation is transmitted to the other inner tube through the gear system consisting of gears 26, 45, 45', 26' to rotate the other inner tube by the same amount since there is no change in the positions of the pivots 45 and 45'. Thus the magnification may be changed by the same amount.

Figure 8:
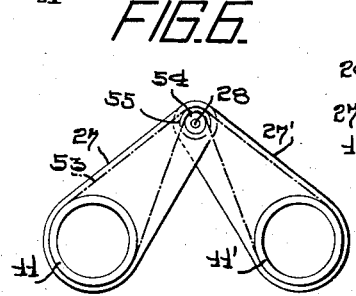
FIG. 8 is a plan view of a binocular similar to that of FIG. 3 having very simple construction.

FIG. 8 illustrates still another embodiment. In this embodiment, the gear systems in the embodiments explained above are all omitted. The supports 27, 27' of inner tubes 11, 11' are pivoted by a pin 28. Pulleys 54, 55 are rotatably mounted on the pin 28 and a belt 53 is hung around the inner tubes 11, 11' through the pulleys 54, 55 as shown in the drawing.

When the support 27 or 27' is turned around the pivot pin 28, the inner tubes 11, 11' are not rotated since the belt is maintained stationary, but when the inner tube is rotated, the belt 53 is rotated by the rotation of the tube to turn the other inner tube by the same degree and hence the change of the magnification of the same degree is effected in the ocular systems on opposite sides.

What we claim is:

1. A binocular having a pair of ocular systems, a pair of supports pivotally connected and supporting said systems so that the distance between the ocular systems can be adjusted in accordance with the distance of the eyes of a user, each ocular system including at least one shiftable lens, an inner tube including a spiral cam, said inner tube slidably suporting said shiftable lens, at least one fixed lens, and an outer tube having an axial slit, said outer tube fixedly supporting said fixed lens, said shiftable lens including a pin engaging the spiral cam and the axial slit so that the shiftable lens can be moved in relation to the fixed lens to change the magnification of the ocular system in response to relative rotation between the inner tube and the outer tube; a gear fixed to each of said inner tubes and an intermediate gear in engagement with said fixed gears, said gears constituting a system whereby the two inner tubes are rotated in relation to the outer tubes to give the same magnification to each ocular system, and a further gear system between the two outer tubes to rotate one of the outer tubes in response to the adjustment of the distance between the two ocular systems in the same direction as the respective associated inner tube which occurs during such adjustment.

2. A binocular according to claim 1, wherein each ocular system includes a body part and wherein said further system comprises a gear fixed on the outer tube of one of the ocular systems, the latter said outer tube being integral with the associated body part and projecting away from the latter said outer tube and a gear fixed on the outer tube of the other ocular system, the latter said tube being rotatably mounted on the body part of the associated ocular system, the gears associated with the two outer tubes being in engagement with each other.

References Cited in the file of this patent
UNITED STATES PATENTS 937,834    Martin et al. _____ Oct. 26, 1909

FOREIGN PATENTS 99,849    Germany _____ Nov. 5, 1898